(No Model.) 2 Sheets—Sheet 2.
G. A. GUSTIN.
APPARATUS FOR AUTOMATICALLY REGULATING THE FLOW AND TEMPERATURE OF FLUIDS.
No. 390,960. Patented Oct. 9, 1888.
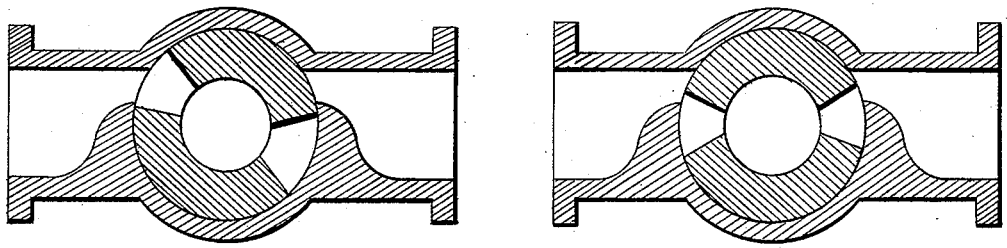
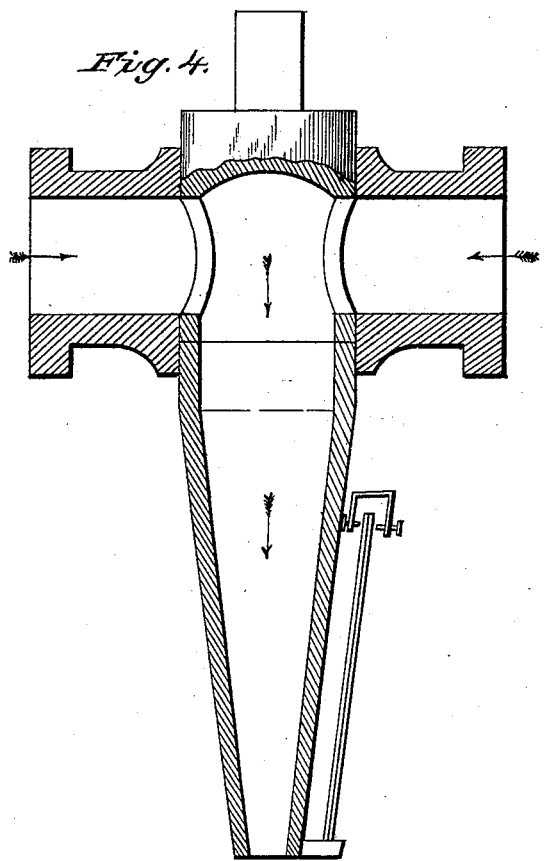

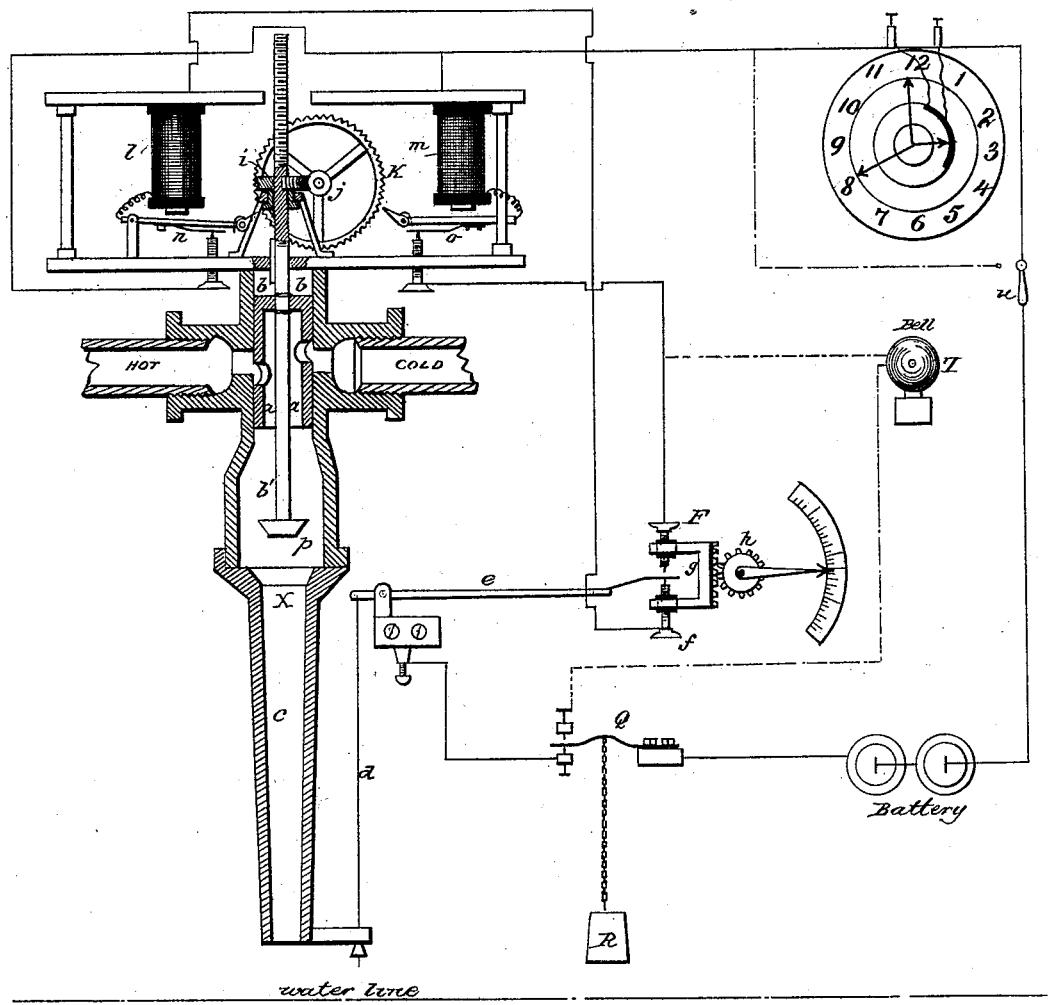

UNITED STATES PATENT OFFICE.

GEORGE A. GUSTIN, OF WASHINGTON, DISTRICT OF COLUMBIA.

APPARATUS FOR AUTOMATICALLY REGULATING THE FLOW AND TEMPERATURE OF FLUIDS.

SPECIFICATION forming part of Letters Patent No. 390,960, dated October 9, 1888.

Application filed February 15, 1888. Serial No. 264,150. (No model.)

*To all whom it may concern:*

Be it known that I, GEORGE ALBERT GUSTIN, of Washington city, in the District of Columbia, have invented a new and useful Improvement in Apparatus for Automatically Regulating the Flow and Temperature of Fluids, of which the following is a specification.

The object of my invention is to provide means for automatically drawing from the different sources of supply hot and cold water in any desired admixture to give a special temperature for bathing or other purpose and at any given time—for instance, a device that will draw one's bath-tub full of water at any desired temperature at a set hour, just before rising in the morning, and which same device will also sound an alarm on a bell when it has fulfilled its function.

My invention consists of a valve operated by electro-magnets and a battery, in combination with a thermostat and a weight so arranged that the thermostat can be set at any desired temperature on its scale, the thermostat being operated either directly or indirectly by the temperature of the water which it is intended to control, and connected electrically with one or more electro-magnets which operate the valve.

Figure 1 is a vertical section of the valve mechanism with diagram of circuits; and Figs. 2, 3, and 4 are detail views showing modified forms of the valve.

Referring to the drawings, *a a* is the valve, which is cylindrical and hollow, working upward or downward in the chamber *b b*, to which at the right and left sides are attached the pipes to convey the hot and cold fluid.

C is a nozzle made of a substance which is sensitive to changes of temperature, elongating with heat and contracting with cold. This nozzle is connected by the wire *d* with the lever *e*, which is pivoted with its short end next to wire *d*, the long end playing between two insulated screws, *f* and F, in the movable yoke-piece *g*, which can be raised or lowered by the rack and pinion *h*. The stem of the valve passes through the top of the valve-chamber *b*, and is threaded with a screw, upon which an interiorly-threaded worm-wheel, *i*, is fitted. This worm-wheel is turned by the worm *j* on the axis of the ratchet-wheel K, the ratchet-wheel being turned by short pawls on one or the other of the armatures of the magnets *l* and *m* by the current passing through the magnets by way of the armature and contact-springs *n* or *o*, accordingly as either magnet is thrown into the electric circuit by the thermostat operating the movable arm *e*. As the current passes into the coils of either magnet it attracts the armatures, breaking the contact at the springs *n* or *o*, and the armatures then fall upon the springs, only to be again attracted by a renewal of the circuit. By this means the armatures are made to vibrate rapidly and turn the ratchet-wheel by means of their respective pawls, thus raising or lowering the valve *a* and regulating the hot and cold ports in the chamber *b b*, which are arranged to register with the ports in the hollow valve *a*, as follows: When the valve is at the top of the chamber, the hot ports register; when at the median line, the hot and cold ports are both partially open, as shown in Fig. 1; when a little below the median line, the hot port is closed and the cold port is open, and when still lower both ports, as well as the opening X in the nozzle C, are closed, the latter by the plug *p*, and the flow is then stopped.

Q is a spring-switch, held closed by a weight, R, until released, as hereinafter explained. When closed, the current from the battery will flow through the circuit, which is at the time completed by the lever *e* resting upon one or the other of the insulated screws *f* F. When the spring Q is released, the current will then follow the circuit shown by the dotted lines.

S is an ordinary clock provided with a circuit-closing wheel, so arranged that it can be set to close the circuit at any hour desired, and T is an ordinary vibrating electric bell.

U is a switch, which may be used to close the circuit outside of the clock or through it, and to open the circuit.

The operation of the apparatus is as follows: The circuit being closed, either by the clock or switch, the current passes from the battery, through the spring Q, to the lever *e*, which, when the apparatus is at rest, will be in contact with the insulated screw *f*. Thence the current passes to the magnet *l*, the armature of which vibrates rapidly and turns the ratchet-wheel, worm, and worm-wheel, the motion of the latter raising the valve *a* until the hot port in the chamber $b$ registers with the hot port in the valve $a$, the cold ports being closed. The hot fluid, passing down through the chamber $b$ and nozzle C, elongates the latter, which causes the lever $e$ to raise its longer end and break the contact with the screw $f$, making contact with the screw F. The current then passes into the magnet $m$, causing its armature to vibrate and turn the ratchet, worm, and worm-wheel in a contrary direction to that made by the action of the magnet $l$. This movement closes the hot ports and opens the cold ones. The action of the cold water upon the thermostatic nozzle C shortens it, and the lever $e$ then falls back upon the screw $f$. This action is repeated again and again, in a lesser degree each time, until the valve has reached a position where the admixture of the hot and cold fluids in the mixing-chamber $b'$ $b'$ produces a temperature which is normal to the thermostatic tube C in its relations with the adjusting-screws $f$ F, when the lever $e$ will take a position between the two screws, there remaining until the temperature of the fluid flowing through the nozzle is raised or lowered, when the above-described action will be repeated until equilibrium is again established.

The weight, R, closing the spring switch Q, is made of a material somewhat heavier than water, and is so proportioned as to bulk that when totally immersed in any fluid the difference in its weight caused by such immersion enables the spring Q to raise it and break the circuit to the lever $e$, at the same time closing the circuit shown in the dotted lines, through the electric bell and the magnet $m$, which latter, by its action on the ratchet-wheel, lowers the valve $a$ until all the ports and the opening X in the nozzle C are closed and the water shut off.

It will therefore be seen that when the level of the water in the bath-tub reaches the weight R the valve is automatically closed and the signal is given that the tub is ready for use. By adjusting the contact devices of the clock the device may be set to operate at any prearranged hour, after the manner of an alarm-clock. The contact-spring in the electric bell only shunts the current instead of breaking it, and therefore offers no impediment to the working of the magnet M. The bell will then ring continuously until cut off by breaking the circuit at the switch U. When the fluid is drawn from the tank, the weight R will close the circuit through the spring Q to the lever $e$, which will have resumed its normal position on the contact-screw $f$. The object in using a weight instead of a float is that it gives a greater stability with all the advantages of the float.

In Fig. 2 is shown a modification of the valve in which a rotary motion is used instead of a sliding one, and an ordinary thermostat, $C^2$, composed of two pieces of metal of different rates of expansion, is shown attached to its nozzle. When the rotary valve shown in Figs. 2, 3, and 4 is used, the worm-wheel $i$ is rigidly keyed on the valve-stem, and the latter has no longitudinal motion.

My invention has a wider field of application than for domestic uses in the bath-room, and may be employed with useful effect in breweries, dye-houses, chemical factories, &c.

What I claim as my invention, and desire to secure by Letters Patent, is—

1. An apparatus for controlling the flow and temperature of fluids automatically, consisting of a double-acting valve and hot and cold water pipes, in combination with a thermostat actuated by the variations in temperature of the passing fluid, a battery and electric circuit controlled by the thermostat, and electro-magnets and valve-adjusting mechanism operated thereby, whereby the proper proportions of hot and cold fluid may be allowed to commingle to give the desired temperature, substantially as shown and described.

2. The combination of a double acting valve and the hot and cold water pipes, a battery, and set of electro-magnets, with mechanism for operating the valve, a thermostat for diverting the electric circuit from one magnet to the other, a shunt-circuit, and a switch or circuit closing spring, Q, provided with a weight, R, adapted to be raised by the level of the liquid to close the valve and divert the battery-current to the shunt-circuit, as described.

3. In an apparatus for regulating the flow and temperature of liquids, the combination, with the electric circuit and a shunt-circuit, of the spring Q, arranged between the terminals of the main and shunt circuits, and weight R, suspended upon the spring and holding it closed upon the main-circuit terminal until raised by the water-level, and the bell T, arranged in the shunt-circuit, substantially as described.

4. An apparatus for controlling the flow and temperature of fluids automatically, consisting of a double-acting valve, a thermostat actuated by the variations in temperature of the passing fluid, a battery-circuit and electric contacts controlled by the thermostat, a set of electro-magnets operated by the battery-circuit, adjusting mechanism for the valve, worked by the electro-magnets, and a time-clock with contact devices for setting the apparatus at work at any given time, substantially as and for the purpose described.

GEO. A. GUSTIN.

Witnesses:
  EDWD. W. BYRN,
  SOLON C. KEMON.